INVENTORS
JOHN W. BREMER
DWIGHT W. DOSS
BRUCE T. McKEEVER
BY Samuel E. Turner
ATTORNEY March 28, 1967 J. W. BREMER ETAL 3,311,898

CONTENT ADDRESSED MEMORY SYSTEM

Filed April 1, 1963 3 Sheets-Sheet 2

CONTENT ADDRESSED MEMORY SYSTEM

Filed April 1, 1963 3 Sheets-Sheet 3

3,311,898
CONTENT ADDRESSED MEMORY SYSTEM
John Wood Bremer, Sunnyvale, Dwight W. Doss, Santa Clara, and Bruce T. McKeever, Cupertino, Calif., assignors to General Electric Company, a corporation of New York
Filed Apr. 1, 1963, Ser. No. 269,371
18 Claims. (Cl. 340—173.1)

This invention relates to content addressed memory systems wherein stored data is addressed by content rather than by location. Such systems are also designated data-addressed or associative memory systems.

The invention relates more particularly to a highly flexible content addressed memory system wherein logic functions are performed within and as an intimate part of the information retrieval function.

In conventional computer memory systems discrete blocks of data or data words are stored at sequentially numbered locations or addresses. To enter a data word into the memory of such a system an address is assigned. The assigned address is then selected by an address register and selection circuit. To retrieve or read out a data word from such a system the address at which the word is stored must ordinarily be known or a lengthy word-by-word search performed. Furthermore, to perform logic operations in such conventional systems it is ordinarily necessary to first retrieve from storage the data to be operated upon and then to apply it to separate logic structure for performing the logic functions.

For certain data-processing problems it is desirable to read or retrieve stored words on the basis of their content rather than their location. Associative memory systems are now known wherein searching time is reduced by interrogating all of the stored words substantially simultaneously and within a stored word may be retrieved in response to an interrogation of selected parts of the word. For example, in a data processing system the data words may contain certain data facts concerning employees such as the number of years of service, social security number and salary, as well as other data facts. An entire data word may be retrieved in response to an interrogation for only one data fact of the several data facts constituting a data word. Thus, for example the records of all employees having a given number of years of service may be retrieved.

In such search operations it is clear that there is frequent occurrence of multiple comparisons, that is, more than one data word in the memory matches the interrogation word. To make each such matching word available in sequence, the read-out of all but the first matching word is inhibited. After the desired operations are performed on the first word, the second word is read out, the read-out of all others being inhibited, and so forth.

A memory system which performs the above-described operations is disclosed by John W. Bremer in a copending U.S. patent application Ser. No. 226,517, filed September 27, 1962, entitled, "Cryogenic Associative Memory," which is assigned to the same assignee as the present invention. In that application there is shown and claimed a memory matrix formed of improved bit storage cells and a simplified selection logic circuit which cooperates with the memory matrix to inhibit all except one of multiple interrogation responses according to a predetermined order.

Another associative or data-addressed memory system is shown by John W. Bremer, Dwight W. Doss and Bruce T. McKeever in a copending U.S. patent application Ser. No. 249,033, filed Jan. 2, 1963, entitled, "Associative Memory," which is assigned to the same assignee as the present invention. This system provided expanded capability over prior systems including the capability of association between successive interrogation words whereby a number of logical functions can be achieved.

It is desirable to further extend the capability of associative memory systems whereby a wide variety of logic and data retrieval functions can be performed.

It is therefore an object of the invention to provide an improved content addressed or associative memory system.

It is another object of the invention to provide a content addressed memory system of great versatility and flexibility.

It is another object of the invention to provide an associative memory system wherein the performance of logic functions and data retrieval are combined.

It is further desirable to provide the capability of writing into a selected storage cell of a content addressed memory without altering the state of other storage cells. This capability allows the use of any selected cell as a marker or storage of, for example, the result of an interrogation.

It is therefore another object of the invention to provide a content addressed memory formed of a plurality of storage cells wherein the information representing state of a selected cell may be altered without affecting the information representing state of unselected cells.

For some operations it is desirable to simultaneously select all of the words which match an interrogation word. For example, with this capability along with the ability to write in individual storage cells, the rows of storage cells containing matching words may be marked simultaneously by simultaneously writing a match indication into corresponding marker bit storage cells.

It is therefore a further object of the invention to substantially simultaneously select all words stored in the memory which match an interrogation word.

For some operations it is desirable to select the word following a previously selected word. With this capability any desired number of subsequent contiguous words may be selected in succession independent of interrogation.

It is therefore another object of the invention to enable for selection a row of storage cells for read and/or write operations in response to the selected condition of the next previous row.

These and other objects of the invention are achieved according to the preferred illustrated embodiment of the invention by providing a content addressed memory system formed of networks of cryotrons. The storage function is provided by a matrix of persistent current storage cells arranged in rows and columns, each row of storage cells being adapted to provide storage for a data word, the columns corresponding to the digits or bit positions of the stored words.

An improved storage cell provides the capability of writing into any selected individual storage cell of the memory matrix without affecting the information representing states of other storage cells.

Operation control circuitry is provided: for selectively interrogating any combination of bit positions or columns of the memory; for selectively transferring the results of a search, as represented by currents in row lines, to match-indicating circuits; for selecting (for read and/or write operations) the first row in which the match-indicating circuit indicates a match; for selecting all rows in which the match-indicating circuits indicate a match; for selecting the row following a previously selected row; and for performing read and/or write operations in the storage cells of a selected row.

The capability of individual bit writing and the operational flexibility of the control and selection circuitry provides achievement of a wide variety of logic functions in association with the information storage and retrieval function, a further feature of the system being that it is made up of repetitive rows of similar structure.

The structure, organization and operation of the invention is described more specifically in the following detailed description with reference to the accompanying drawings in which.

Figure 4A:
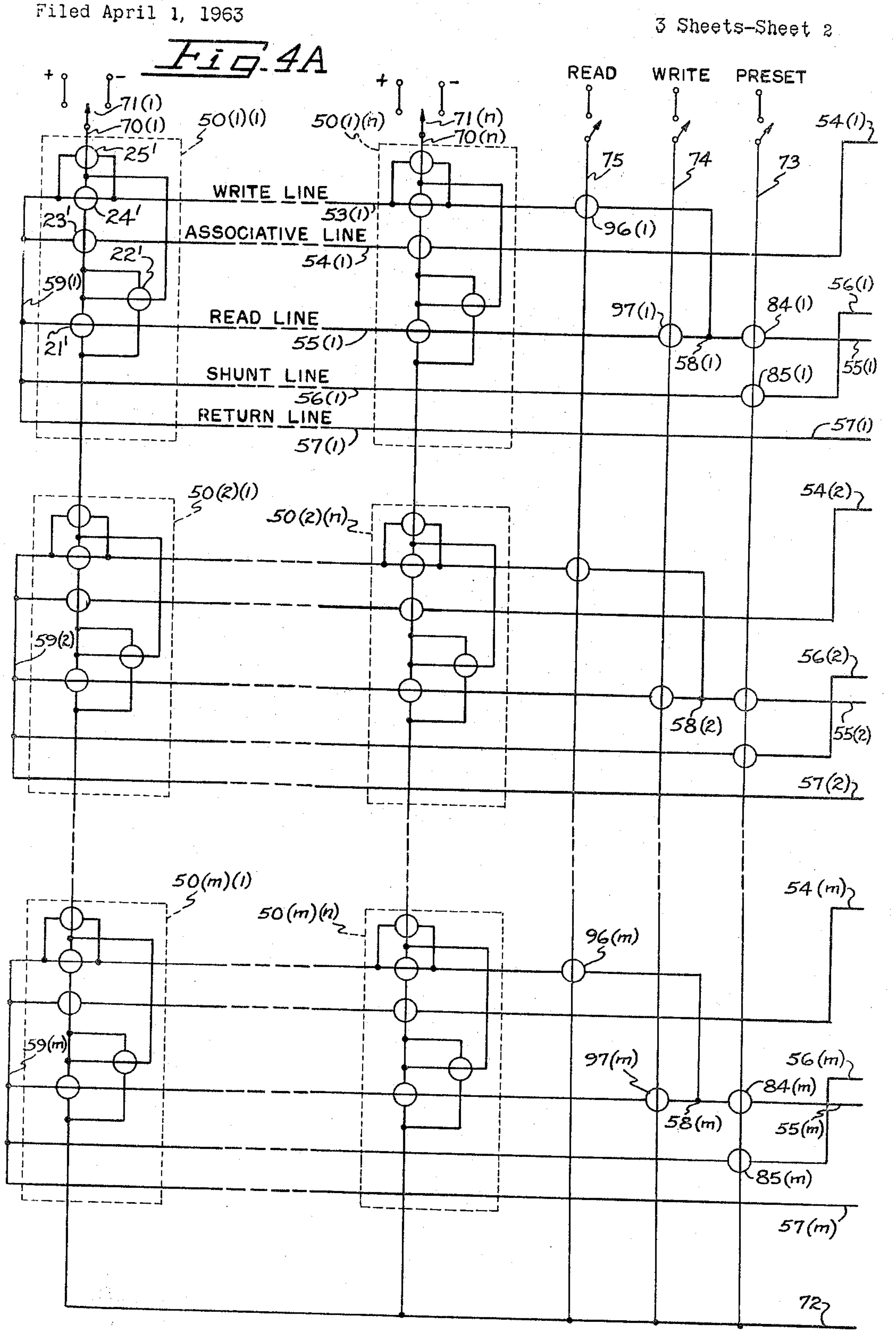
Figure 4B:
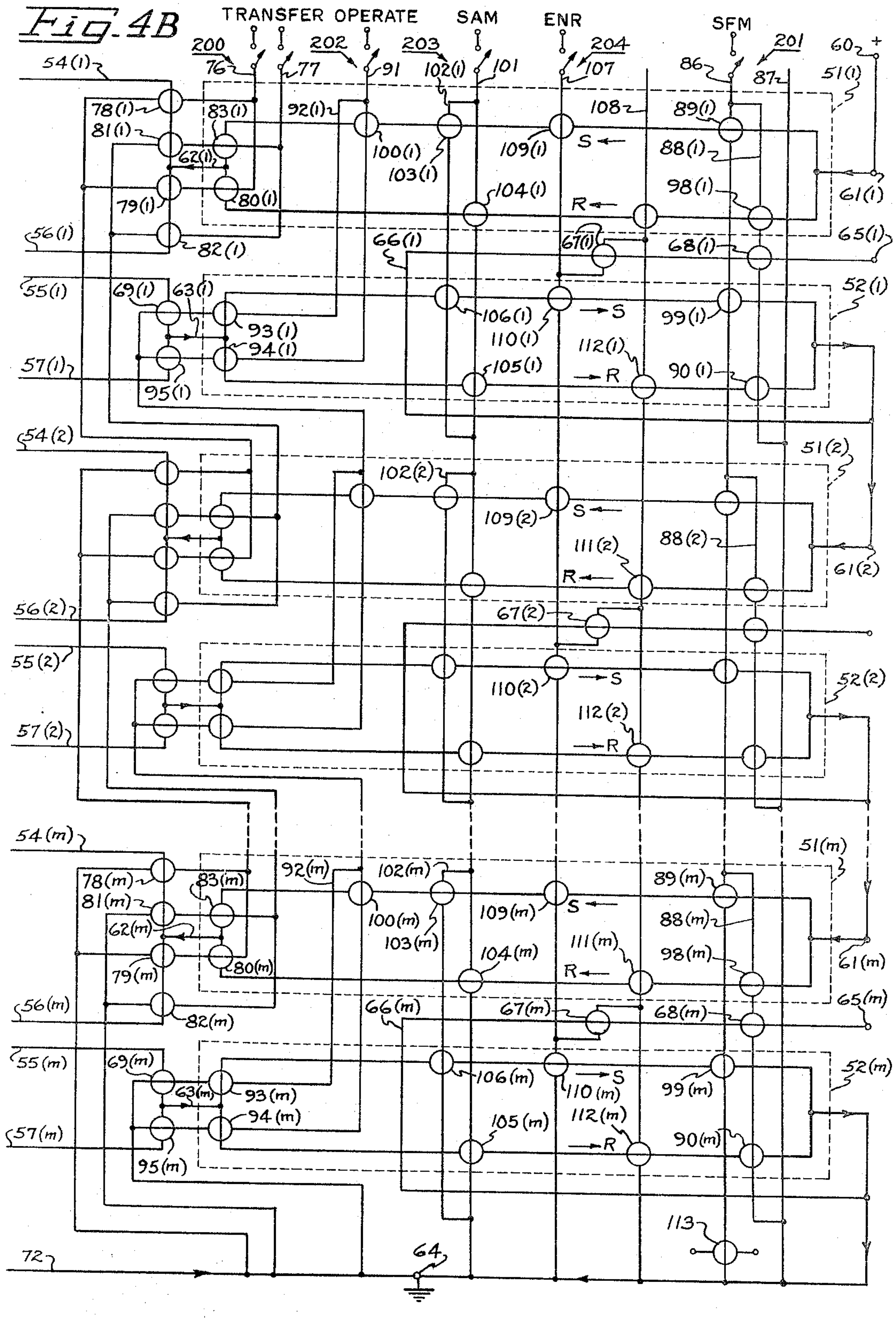

FIGURES 4A and 4B, taken together, constitute a schematic illustration of a content addressed memory system according to the invention.

The illustrated embodiment of the data-addressed memory system of the invention is formed of networks of superconductive switches or cryotrons. Certain electrical conductors are known to exhibit a loss of electrical resistance at supercold temperatures approaching absolute zero and to regain resistance in the presence of a certain "critical" magnetic field. The critical field depends upon the particular superconductive material as well as its temperature. Superconductive materials requiring comparatively high critical magnetic fields are known as "hard" superconductors while those requiring comparatively low critical magnetic fields are known as "soft" superconductors.

Superconductors can be used to form a cryotron or superconductive switch. In the preferred thin-film form the cryotron comprises a gate conductor film of soft superconductive material which is crossed by a narrow control conductor film insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

Because of low heat losses, cryogenic devices of the thin-film form may be greatly miniaturized and many cryotron elements can be contained in a small volume. Thus cryotron elements are well adapted to the formation of large capacity computer memory units.

Figure 1:
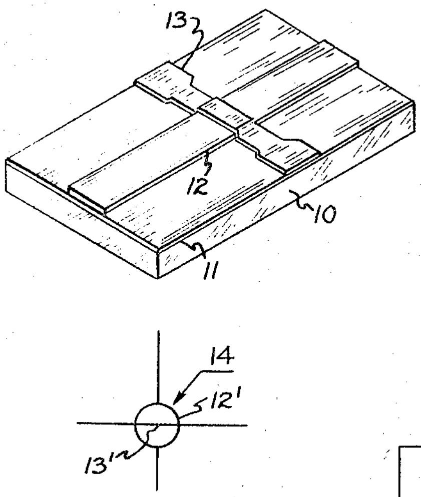
FIGURE 1 is a perspective view of an example of the structure of a thin-film cryotron together with a schematic symbol thereof.

Shown in FIG. 1 is an example of the structure of the thin film form of a basic cryotron or superconductive switching element. Thin film cryotron circuitry is ordinarily formed on a flat base or substrate such as a substrate 10. A substrate is ordinarily formed of an insulating material having a smooth surface such as glass. In order to decrease circuit inductance it is preferable to provide a superconductive shield plane 11 underlying the cryogenic circuitry. The shield plane 11 may be formed of a thin film of hard superconductive material such as lead. A layer of insulating material such as silicon monoxide, not shown, is formed over the shield plane 11 to insulate the subsequently formed structure therefrom.

The active portions of the cryotron comprise a gate conductor 12 hereinafter referred to as a "gate" which is crossed by a control conductor 13 hereinafter referred to as a "control." The control 13 is insulated from the gate 12 by a film of insulating material such as silicon monoxide. The gate 12 is formed of soft superconductive material such as tin while the control 13 is formed of a hard superconductive material such as lead. Thus the magnetic field resulting from a sufficient current flow in the control 13 causes the gate 12 to become resistive in the region of the cross-over while the superconductivity of the hard superconductive material of the control 13 is not destroyed. Thus the cryotron comprises a two-state device, that is, the gate is superconductive in the absence of a current in the control and the gate is resistive in the presence of a current in the control which exceeds a predetermined design threshold.

Also shown in FIG. 1 is a schematic symbol 14 which is used herein to represent a cryotron. The gate is represented by a circle 12' and the control by a line 13' crossing the circle. (A more detailed discussion of cryotrons is given by John W. Bremer in "Superconductive Devices," Chaper 2, McGraw-Hill Book Company Inc., New York, 1962.)

Figure 2:
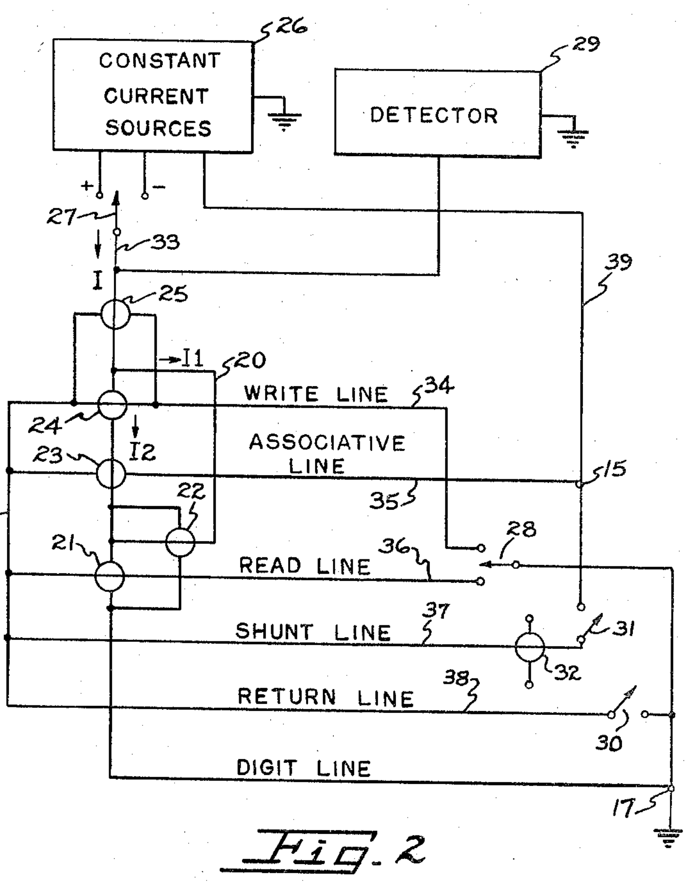
FIGURE 2 is a schematic illustration of the improved storage cell of the invention.

A bit storage cell, a plurality of which form the memory matrix of the content-addressed or associative memory of the present invention, is shown in FIG. 2. This storage cell is an improvement over the storage cell shown and claimed in the aforementioned patent application Ser. No. 226,517.

Briefly, the storage cell includes a cryotron controlled superconductive loop in which a persistent circulating current can be established to represent a bit of information. Binary information can thus be stored by the cell according to the direction of the persistent current. According to the convention followed in the present description, the cell is considered to be storing a binary "1" when the persistent current is flowing clockwise in the loop and a binary "0" when the presistent current is flowing counterclockwise.

Structure is provided for writing in the cell, that is, for establishing a persistent current in a selected direction in the persistent current loop, for reading from the cell, that is, for detecting the direction of a stored persistent current, for interrogating the cell, that is, for comparing an applied bit representing indication with the bit representing state of the cell, and for indicating the result of the interrogation. As an improvement over the storage cell disclosed in the aforementioned patent application Ser. No. 226,517, further structure is provided for allowing current in a write line to pass through the storage cell without affecting the persistent current stored in the cell, that is, without affecting the information representing state of the cell. This improvement provides the capability of individual bit writing, that is, where a plurality of storage cells are arranged in a row for storing a word and a single write line passes through all of the cells of the row, information may be written into selected ones of the storage cells of the row without affecting the state of the unselected storage cells.

The improved storage cell includes five cryotrons 21–25, a branch circuit 20, a digit line 33, a write line 34, an associative line 35, a read line 36, a shunt line 37 and a return line 38. A persistent current loop is formed by the branch circuit 20, the gate of cryotron 24 and the control of cryotron 23, the branch circuit 20 including the control of cryotron 22. A source of constant currents 26 supplies currents for circuit operation. The source 26 supplies currents of unit magnitude, a current of unit magnitude being defined as at or above the cryotron control threshold value, that is, a current of unit magnitude through the control of a cryotron renders the gate of the cryotron resistive.

The persistent current loop provides two parallel paths for a digit current I, a first path through the branch circuit 20, current therein being designated a current I1, and a second path through the gate of cryotron 24 and the control of cryotron 23, current in this second path being designated a current I2. ("Downward" currents are considered positive herein while "upward" currents are considered negative.) The cell is constructed so that the inductance of the I1 and I2 current paths are substantially equal. In such case the magnitude of stored persistent current is substantially one-half the magnitude of the applied digit current, that is, one-half unit magnitude. (The cryotron 23 has a control current threshold of greater than one-half unit current. Thus a stored persistent current through the control of cryotron 23 does not make the gate thereof resistive.)

A lead 39 is connected between the current sources 26 and a terminal 15 for supplying a "word current"

to the write, associative, read, shunt and return lines, collectively referred to as "row lines." The designations word current and row lines are employed because these row lines pass through all the storage cells of a row of cells for storing a word in the memory system. By actuation of various combinatoins of a plurality of switches 28, 30 and 31 and by operation of the cryotrons of the storage cell, the word current is directed in appropriate paths through the row lines according to the operation to be performed as will appear from the following descriptions of operations.

The write operation will be described first. To write a "1," that is, to establish a clockwise persistent current in the storage cell, a positive (downward) digit current I is applied, by means of a switch 27 for example, to the digit line 33. The word current is directed through the write line 34 by closing switch 31 and closing switch 28 to the write line. With switches 28 and 31 thus closed, the word current, received at terminal 15 from source 26, flows leftward through the shunt line 37 and/or the associative line 35, through a connection 16, which interconnects the left ends of the row lines, then rightward through the write line 34, through switch 28 and thence to a common terminal 17.

The word current in the write line 34 renders the gate of cryotron 24 resistive, and therefore the I2 current path resistive, the gate of cryotron 25 being resistive due to the digit current flow through its control. Since the branch circuit 20 (the I1 current path) remains superconductive, substantially all of the applied digit current flows therethrough. The word current in the write line 34 is now turned off allowing the gate of cryotron 24 and therefore the I2 current path to become superconductive. The digit current in digit line 33 is then turned off. The stored energy due to the inductance of the branch circuit 20 forces negative (upward) current flow in the now superconductive I2 current path and a clockwise persistent current, comprising currents I1 and —I2, is thus established in the loop to represent a "1."

The writing of a "0," that is, the establishment of a counterclockwise persistent current, is similar to the writing of a "1" as described above with the difference that a negative (upward) rather than a positive digit current is applied to the digit line 33. Thus in the case of a stored "0" the established counterclockwise persistent current comprises the currents —I1 and I2.

Attention is directed to cryotron 25, the gate of which is connected in parallel with the control of cryotron 24. This structure provides the capability of individual bit write where a plurality of storage cells are arranged in a row for storing a word as in the memory arrangement to be described hereinafter. The gate of cryotron 25 provides a parallel path for the word current in the write line thus reducing the current through the control of cryotron 24 below the threshold value. Therefore the state of the cell is not affected unless and until a digit current is applied to the digit line 33. When a digit current is applied, it flows through the control of cryotron 25 and renders the gate thereof resistive thus directing the word current in the write line through the control of cryotron 24. Thus by merely not applying a digit current to the digit line of the storage cell, the cell is omitted from a write operation.

A read operation, that is, the detection of the direction of a persistent current in the loop, is performed by applying word current to the read line 36 (for example, by closing switch 31 and closing switch 28 to the read line) and by applying a positive digit current to the digit line 33. The read line 36 includes the control of cryotron 21 and thus the word current in the read line renders the gate of cryotron 21 resistive. Since the I1 and I2 current paths are both superconductive, the applied digit current divides in inverse proportion to the inductance of the two paths. Because the inductances are assumed to be equal in the present illustrative example, the digit current divides equally, thus adding or substracting a current of one-half unit magnitude to or from the currents I1 and I2, as the case may be.

In the case of a stored "1" the loop current is clockwise and thus the digit current adds to the persistent current in the I1 current path and subtracts from the persistent current in the I2 current path. Thus, in the case of a "1," when the positive digit current is applied the current I1 is of unit magnitude. This current through the control of cryotron 22 renders the gate of cryotron 22 resistive. Since the gate of cryotron 21 is also resistive, due to the word current in the read line, the digit current encounters resistance in the digit line 33. The voltage drop due to this encountered resistance may be detected, for example, by a voltage detector 29 connected to the digit line, to indicate a stored "1."

In the case of a stored "0," that is, a counterclockwise persistent current, the applied digit current adds to the current in the I2 current path and subtracts from the current in the I1 current path. Thus the current I1 becomes substantially zero and the gate of cryotron 22 and therefore the digit line 33 remains superconductive, the consequent absence of resistance to the digit current being indicative of a stored "0."

A read operation may also be accomplished by applying an upward or negative, instead of a positive, digit current. In this case, a counterclockwise persistent current, indicative of a stored "0," results in resistance to the negative digit current, while for a clockwise persistent current, indicative of a stored "1," the digit line remains superconducting.

Also to be considered is the condition where no persistent current has been stored in the storage cell. In this condition of no information in the storage cell, the digit line remains superconducting for either a positive or negative digit current.

It is noted that this condition of no information in the storage cell can be achieved by removing a previously stored persistent current in the following manner: Apply a digit current to the digit line and word current to the write line as in a write operation. Now shut off the digit current. All of the word current continues to flow through the control of cryotron 24 thereby rendering the gate thereof resistive despite the fact that the parallel connected gate of cryotron 25 is now superconductive. (This is in accordance with the principle that a current once established in a superconducting path remains in that path until diverted even though parallel paths subsequently become superconductive.) This resistance in the storage loop dissipates the persistent current.

The storage cell of FIG. 2 includes interrogation structure for providing an indication of whether or not the bit stored in the cell matches an interrogation bit. To perform an interrogate operation switch 30 is closed. The word current thus flows from terminal 15 leftward through the associative line 35, which includes the gate of cryotron 23, through connection 16, rightward through return line 38, through switch 30 and thence to the common terminal 17. The switch 31 is then closed thus placing the shunt line 37 in parallel with the associative line to thereby provide an alternative path for the word current. It is noted however that the word current continues to flow in the associative line at this time. This is according to the previously stated principle that if a current is established in one of a plurality of parallel superconducting paths, it will continue to flow in that path to the exclusion of the other paths until a resistance or other influence is imposed to divert the current.

To interrogate for a "1" the switch 27 is closed to apply a positive (downward) digit current to the digit line 33. In other words, in an interrogate operation, an applied positive digit current represents a "1" interrogation bit. The applied digit current divides to flow through the two current paths provided by the persistent current loop. Assuming that the persistent current in the loop is clockwise to represent a stored "1," the digit current adds to the persistent current in the I1 current path and subtracts in the I2 current path. Thus during the application of the digit current the current I2 is substantially zero. Therefore the gate of cryotron 23 remains superconductive and the word current continues to flow in the associative line 35 thus indicating a match or identity between the "1" interrogation bit and the "1" stored bit.

As another example, the case of an interrogation for a "0" when the storage cell contains a "1" is considered. To interrogate for a "0" a word current is established in the associative line 35 and the switch 31 is then closed as described above. The switch 27 is then closed to apply a negative (upward) digit current to the digit line 33, an applied negative digit current representing a "0" interrogation bit. This upward flowing digit current divides between the two paths of the persistent current loop thus adding to the upward persistent current in the I2 current path, making a total current of unit magnitude in this path through the control of cryotron 23. The gate of cryotron 23 thus becomes resistive. This causes the word current to be diverted from the associative line 35 to the shunt line 37 to thus indicate a mismatch or lack of identity between the "0" interrogation bit and the stored "1" bit. A cryotron 32 may be provided to sense the presence of the word current in the shunt line 37.

The cases of interrogation for a "1" and a "0" when the storage cell contains a "0" will not be specifically described. Operation in these cases is believed to be readily deducible from the above described examples. In summary, when the stored bit matches the interrogation bit, the gate of cryotron 23 remains superconductive and the word current remains in the associative line. When the stored bit is different from the interrogation bit, the gate of cryotron 23 is rendered resistive and the word current is diverted to the shunt line.

There remains to be considered the condition from no persistent current has been stored in the storage cell. This condition of no information in the storage cell, which may be called a "no comment" or "neutral" state, matches either a "0" or a "1" interrogation bit because the word current remains in the associative line in either case, the divided digit current alone through the control of cryotron 23 being insufficient to render the gate of cryotron 23 resistive. In other words, during interrogation with a "1" interrogation bit, the "no comment" or "neutral" state has the characteristic of a stored "1" because it satisfies the interrogation whereby the word current remains in the associative line. Similarly, during interrogation with a "0" interrogation bit, the "no comment" state has the characteristic of a stored "0" in that it satisfies the interrogation. However, during a read operation this condition of no stored persistent current takes on its characteristic of "no comment" or "neutral" because it introduces no resistance in the digit line for either an upward or downward digit current during the read operation. Thus the "no comment" state can be distinguished from the stored "0" or "1" state from the fact that the "no comment" satisfies any interrogation but it provides no indication during any read operation. This state of "no comment" provides a form of internal masking which greatly enhances the flexibility and versatility of the system as will be more apparent from the example of operation of rearrangement of bits described hereinafter.

Figure 3:
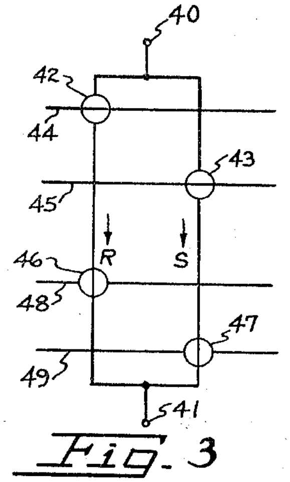
FIGURE 3 is a schematic illustration of a "J cell" circuit as employed in the system of the invention.

In FIG. 3 there is schematically illustrated a cryotron circuit called a "J cell." While the circuit and its operation are relatively simple, a clear understanding of the circuit will aid the understanding of the system of the invention to be described hereinafter.

The J cell is formed of a pair of parallel current paths. Cryotrons in each path may be controlled to direct the current applied to the cell through one or the other of the alternative current paths, thus providing input control of the cell. Other cryotrons in the current paths provide an output indication from the cell.

The J cell provides two different functions in the present system. By applying a continuous constant current to the cell it can be employed as a two state device or flip-flop. The J cell can also be used as information transfer circuit by applying appropriately timed current pulses to the cell. Operation of the J cell as a flip-flop will be described first with reference to FIG. 3.

The J cell illustrated in FIG. 3 comprises a pair of parallel current paths between a pair of terminals 40 and 41 to which a continuous constant current is applied for flip-flop operation. Operation is such that one or the other of the current paths is superconductive at any given time. A current established in one superconductive path remains in that path even though the other path subsequently becomes superconductive, thus the J cell flip-flop is a two state device having a "set" state when the applied current is flowing in a given path and a reset state when the current is flowing in the other path.

Thus when the applied current is flowing in the left-hand path, the J cell flip-flop is arbitrarily considered to be in the reset state as indicated by an arrow and the letter R in FIG. 3. When the current is flowing in the right-hand path, the flip-flop is thus in the set state as indicated by an arrow and the letter S. The left-hand path may thus be designated the reset path or side while the right-hand path may be designated the set path or side.

A cryotron 42 in the reset path and a cryotron 43 in the set path provide input control of the flip-flop. A current applied to an input line 44 renders the gate of cryoton 42 resistive, and hence the reset path resistive thus diverting the flip-flop current to the set path. Similarly, a current applied to an input line 45 resets the flip-flop by rendering the gate of cryotron 43 resistive thus diverting the flip-flop current to the reset path.

A pair of cryotrons 46 and 47 are provided to indicate the state of the flip-flop. If the flip-flop is in the reset state the flip-flop current flows through the control of cryotron 46 thus rendering the gate of cryotron 46 resistive and hence an output line 48 resistive while an output 49 is superconductive because of the absence of current through the control of cryotron 47. When the flip-flop is in the set state the line 48 is superconductive while the line 49 is resistive. These resistive and superconductive conditions of output lines 48 and 49 may be used in a variety of ways to communicate the state of the flip-flop to other circuitry.

To employ the J cell as an information transfer circuit the cell is supplied with a pulse of current at terminals 40 and 41 when the transfer of information from input lines 44 and 45 to output lines 48 and 49 is desired. The input information is represented by a current in one or the other, but not both, of the lines 44 and 45. Current in the line 44 causes the pulse of current applied to terminals 40 and 41 to flow through the control of cryotron 47 thus rendering output line 49 resistive. Similarly, current in input line 45 causes output line 48 to be resistive. In this manner information may be transferred from the input to the output lines by application of a current pulse to the J cell.

A cryogenic embodiment of a content addressed memory system according to the invention is shown in FIGS. 4A and 4B. Alignment of the right-hand edge of FIG. 4A with the left-hand edge of FIG. 4B provides a complete schematic illustration of the system.

The rows and columns of storage cells and part of the operation control circuits of the system are shown in FIG. 4A. The match-indicating circuits, selection circuits and the remainder of the operation control circuits are shown in FIG. 4B. The structure of the system along with explanation of operation of circuits not previously described will be presented first, followed by examples of system operation in performing typical functions.

The storage portion of the system (FIG. 4A) is formed of rows and columns of bit storage cells of the kind shown in FIG. 2 and described hereinbefore. The storage portion of the system includes a plurality of bit storage cells 50(1)(1)–50($m$)($n$) arranged in $m$ rows and $n$ columns. Thus the first row contains storage cells 50(1)(1)–50(1)($n$) and the first column contains storage cells 50(1)(1)–50($m$)(1). Each row of storage cells stores a word, the columns corresponding to the digit or bit positions. To simplify the drawing only the first and last storage cells of each row are shown and only three rows of the memory system structure are illustrated. The illustrated rows are assumed to be the first, second and $m$th rows of the system, it being understood that any reasonable number of rows and columns may be provided. For convenience of relating FIG. 2 to FIG. 4A, similar reference numbers are applied to cryotrons 21′–25′ of the storage cell 50(1)(1) as are applied to the corresponding cryotrons in FIG. 2.

Each row of the memory system is formed of similar structure and includes a match-indicating circuit for storing the result of an interrogation and enabling the row for selection, and a selection circuit for selecting the row, that is, for enabling the row for read and/or write operations. For clarity of identification these circuits are enclosed in dashed lines (FIG. 4B) and are identified as a plurality of match flip-flops 51(1)–51($m$) and a plurality of selection flip-flops 52(1)–52($m$). For example, the first row includes match flip-flop 51(1) and selection flip-flop 52(1). These circuits are of the J cell type as described in connection with FIG. 3, each of these circuits having a set state, as indicated by a respective arrow and letter S, and a reset state, as indicated by a respective arrow and the letter R.

Each row or word storage position includes a write line of a plurality of write lines 53(1)–53($m$), an associative line of a plurality of associative lines 54(1)–54($m$), a read line of a plurality of read lines 55(1)–55($m$), a shunt line of a plurality of shunt lines 56(1)-56($m$), and a return line of a plurality of return lines 57(1)–57($m$). These lines are referred to collectively as row lines. Thus the row lines of the first row include a write line 53(1), and associative line 54(1), a read line 55(1), a shunt line 56(1) and a return line 57(1). Each write line is joined to the read line of the row at a respective junction of a plurality of junctions 58(1)–58($m$). At their left ends, the row lines of each row are connected together by a respective one of a plurality of connections 59(1)–59($m$). The row lines form various current paths for a word current depending on the operation being performed.

Word current is received by the system at a terminal 60 (FIG. 4B) which is connected to a source of constant current (not shown). The match flip-flop, the row lines and the selection flip-flop of each row are connected in series for the word current. Furthermore, the rows of the memory system are connected in series for the word current. Thus assuming that the word current flows into the terminal 60, it flows to an input terminal 61(1) of the first row, through the set or reset side of match flip-flop 51(1) to a connection 62(1), to the left through one or the other of row lines 54(1) and 56(1) to connection 59(1), then to the right through one of the row lines 53(1), 55(1) and 57(1) to a connection 63(1), and thence through the set or reset side of selection flip-flop 52(1) to an input terminal 61(2) of the second row. In similar manner the word current flows through the subsequent rows of the system and finally to a common terminal 64.

Structure is provided for eliminating a row from the operation of the system in the event that there is a fault in the row. For example, the first row can be bypassed by connecting the word current input terminal 60 to a terminal 65(1) instead of to the row input terminal 61(1) as shown. In this event, the word current flows through a line 66(1) and thence to the input terminal 61(2) of the second row thus bypassing the first row. The line 66(1) includes the controls of a pair of cryotrons 67(1) and 68(1) of a plurality of cryotrons 67(1)–67($m$) and 68(1)–68($m$), the gates of cryotrons 67(1) and 68(1) thus becoming resistive to prevent erroneous selection of the first row. Any other row may be similarly bypassed.

Each column or bit position of the array of storage cells 50(1)(1)–50($m$)($n$) of FIG. 4A includes a respective digit line 70(1)–70($n$) each connected between a respective digit switch 71(1)–71($n$) and a common line 72 which, in turn, is connected to the common terminal 64. Each switch 71(1)–71($n$) is operable to connect the corresponding digit line to a source of positive or negative digit current or the switch may be left open during an interrogate operation to omit interrogation of that bit position, that is, to mask the interrogation. An interrogation word is thus represented by the states of these digit switches. A switch closed to allow positive or downward digit current represents a "1" interrogation bit or digit, a switch closed to allow negative or upward digit current represents a "0" bit and an open switch represents a masked bit. (The state of the digit switches also represents the information to be written during a write operation and they are employed during a read operation as described hereinbefore in the description of FIG. 2.)

Also shown in FIG. 4A is a plurality of control lines 73, 74 and 75 for selectively receiving currents to control cryotrons in the row lines to thus control the system operations of preset, write and read. The cryotrons thus controlled, prevent word current flow in one or more of the word lines of each row depending on the operation to be performed.

As mentioned hereinbefore, during an interrogation operation the word current remains in the associative line when the word contained in the storage cells of the row matches the interrogation word, but the word current is diverted to the shunt line when the stored word does not match the interrogation word. Thus these row lines of each row may be considered as having two states during an interrogate operation, a matching state when the word current remains flowing in the associative line and a non-matching state when the word current has been diverted to the shunt line. A transfer circuit 200 (FIG. 4B) is provided for communicating the state of these row lines to the match flip-flop of the row.

The transfer circuit 200, shown to the left of FIG. 4B, includes a pair of lines 76 and 77 for selectively receiving transfer control current pulses. The lines 76 and 77 divide into a pair of parallel paths through a cryotron network in each row to provide a flexible transfer function. Three kinds of transfer operations can be performed, namely, an unconditional transfer, a conditional set transfer and a conditional reset transfer.

Operation of the transfer circuit in the first row will now be explained by way of example, the information to be transferred to the match flip-flop 51(1) being represented by word current flow in one or the other of the lines 54(1) and 56(1).

To perform an unconditional transfer, transfer current is applied simultaneously to lines 76 and 77. If word current is flowing in the associative line 54(1) and not in the shunt line 56(1), the gate of a cryotron 78(1) is resistive and, therefore, the transfer current in line 76 flows through the gate of a cryotron 79(1), this current thus also passing through the control of a cryotron 80(1) in the reset side of match flip-flop 51(1). The control of cryotron 80(1) therefore becomes resistive thereby forcing the match flip-flop 51(1) to its set state with the word current flowing in its upper or set side.

Meanwhile the transfer current in line 77 finds the gate of a cryotron 81(1) resistive. This current therefore flows through the gate of a cryotron 82(1), which is superconductive due to the absence of word current in line 56(1). Thus the transfer current in line 77 under these conditions does not affect the state of the match flip-flop 51(1).

Now assume that the word current is flowing in shunt line 56(1) and not in associative line 54(1). In this case the transfer current on line 76 finds the gate of cryotron 79(1) resistive. Therefore this current flows through the gate of cryotron 78(1) and does not affect the state of match flip-flop 51(1). Meanwhile the transfer current applied to line 77 flows through the control of a cryotron 83(1) and the gate of cryotron 81(1) because of the resistive condition of the gate of cryotron 82(1). This current through the control of cryotron 83(1) renders the gate thereof resistive thereby resetting match flip-flop 51(1) by forcing the word current to flow through its lower or reset side.

Thus by the above-described unconditional transfer operation the match flip-flop is set if the word current is flowing in the associative line and is reset if the word current is flowing in the shunt line.

The conditional transfers are next considered, considering first the application of transfer current to only line 76 which performs the conditional set transfer. In this case if the word current is flowing in the associative line 54(1), the gate of cryotron 78(1) is resistive and the transfer current flows through the control of cryotron 80(1), thus setting the match flip-flop 51(1). However, if the word current is flowing in the shunt line 56(1), the transfer current flows through the gate of cryotron 78(1), because of the resistive condition of the gate of cryotron 79(1), and the state of the match flip-flop 51(1) is not affected. Thus for the conditional set transfer operation the match flip-flop is set in response to word current in the associative line but the state of the flip-flop is not affected by word current in the shunt line.

Consider next the application of transfer current to only line 77 to perform the conditional reset transfer. If the word current is flowing in the associative line 54(1), the gate of cryotron 81(1) is resistive; therefore, the transfer current flows through the gate of cryotron 82(1) and the state of the match flip-flop 51(1) is not affected. However, if the word current is flowing in the shunt line 56(1), the gate of cryotron 82(1) is resistive and the transfer current therefore flows through the control of cryotron 83(1), thus resetting the match flip-flop 51(1). Thus for the conditional reset transfer operation the match flip-flop is reset in response to word current in the shunt line but the state of the flip-flop is not affected by word current in the associative line. The uses of the different transfer operations will be more apparent in the examples of operation of the system to be subsequently described, it being noted that where a transfer is called for, an unconditional transfer is assumed unless otherwise specified.

Interrogate operations will now be considered. To perform a search or interrogate operation, a preset current pulse is first applied to the preset line 73 (FIG. 4A). Referring to the first row by way of example, the preset current pulse renders resistive the gates of a pair of cryotrons 84(1) and 85(1) thereby temporarily rendering resistive the write, read and shunt lines. By this preset operation the word current is forced to flow in the associative line.

Digit currents are now applied to the digit lines 70(1)–70($n$) according to the bit positions and binary values of the bits of the interrogation word, it being noted that any selected combination of bit positions or columns of storage cells can be interrogated, the unselected columns being masked by simply not applying digit currents thereto. In each row that contains a word which matches the interrogation word, the word current continues to flow in the associative line while in each row that contains a non-matching word the word current is diverted to the shunt line due to the resistive condition of the gate of cryotron 23′ in the storage cells containing a non-matching bit as described hereinbefore in the description of FIG. 2.

Thus at the conclusion of an interrogate operation, match information is represented by the word current in the associative line, while mismatch information is represented by word current in the shunt line. This information may now be transferred to the match flip-flops 51(1)–51($m$) by performing an unconditional transfer operation as described hereinbefore, namely, by applying transfer current pulses simultaneously to transfer lines 76 and 77. As a result of such a transfer operation the match flip-flop in each row that contains a word which matches the interrogation word is placed in the set state, while the match flip-flop in each row that contains a non-matching word is placed in the reset state.

After the match information has been stored in the match flip-flops 51(1)–51($m$) it is desirable for some applications to select, for read and/or write operations, the rows containing matching words one at a time in sequence. The structure for accomplishing this operation is shown to the right of FIG. 4B as a "select first match" (SFM) circuit 201. The SFM circuit 201 includes a SFM line 86, a SFM bypass line 87 and a plurality of SFM diversion lines 88(1)–88($m$). The select first match circuit operates to transfer the match information stored in the match flip-flop of the first row that contains a matching word to the selection flip-flop of that row.

As an example of operation of the SFM circuit 201, assume that interrogation and transfer operations have been performed and that the match flip-flop 51(1) is in the set state to indicate that the first row contains a matching word. To perform a first cycle of SFM circuit operation, a current pulse is applied to the SFM line 86. Because the word current is flowing in the upper or set side of the match flip-flop 51(1), the gate of a cryotron 89(1) is resistive. The SFM current therefore flows into the diversion line 88(1) and passes through the control of a cryotron 90(1) thus rendering the gate thereof resistive. The gate of cryotron 90(1) is in the reset side of the selection flip-flop 52(1) of the first row. Thus the resistive gate of cryotron 90(1) causes this selection flip-flop to assume the set state by diverting the word current through its upper or set side.

After flowing through the control of cryotron 90(1) the SFM current flows into the bypass line 87 and thence to the common terminal 64, thus bypassing the selection flip-flops of the other rows of the system. In this way only the first row that contains a matching word is selected.

With the first row thus selected, by virtue of the set state of the selection flip-flop 52(1), reading and/or writing operations may be performed on selected storage cells of this row. To perform these operations an operate current is applied to an operate circuit 202 which includes an operate line 91 and a plurality of branch lines 92(1)–92($m$), the operate line 91 and the branch line of each row passing through a network of cryotrons associated with the selection flip-flop of the row.

With the first row selected, by virtue of the selection flip-flop 52(1) being in the set state, the gate of a cryotron 93(1) is resistive due to the flow of word current through its gate which is in the set side of the selection flip-flop 52(1). The operate current applied to operate line 91 therefore passes through the control of a cryotron 100(1), the gate of a cryotron 94(1), through the control of a cryotron 95(1) and thence down the operate line to the next and subsequent rows. The operate current through the control of cryotron 100(1) renders the gate thereof resistive, this gate being in the set side of the match flip-flop 51(1). In this way the match flip-flop 51(1) is reset so that this row is not again selected by the subsequently applied SFM current pulses.

The operate current through the control of cryotron 95(1) renders the gate thereof resistive. Consequently, the word current is forced to flow through the read line 55(1) to reach the connection 63(1). In FIG. 4A, however, the read line 55(1) and the write line 53(1) provide alternative paths for the word current. Therefore to further condition the system for a read or a write operation a current is applied to the read control line 75 or the write control line 74 depending on the operation desired.

Current applied to the read control line 75 renders the gate of a cryotron 96(1), in the write line 53(1), resistive thus directing the word current through the read line whereby read operations can be performed. Similarly, current applied to the write control line 74 renders the gate of a cryotron 97(1), in the read line 55(1), resistive thus directing the word current through the write line. In this way the system is conditioned for read and write operations which may then be performed by appropriate application of digit currents to the digit lines as explained hereinbefore in connection with FIG. 2, it being noted that to remove the word current from the write line in the performance of a write operation, a current pulse is applied to the read control line 75 (the operate current having been turned off first). This diverts the word current from the write line to the return line. Finally, the digit currents are turned off to complete the write operation.

All of the bit positions may be read or written into simultaneously or any bit position may be omitted from the read or write operation merely by not applying digit current to the bit positions to be omitted. (It is further noted that in unselected rows the operate current flows through the control of a respective one of a plurality of cryotrons 69(1)–69($m$) whereby word current flow in the read and write lines of unselected rows is prevented.)

After read and/or write operations have been completed in the first row that contains a matching word, the next row that contains a matching word may be selected by applying another SFM current pulse to the SFM line 86. Since the match flip-flop 51(1) of the first row is now in the reset state, the gate of a cryotron 98(1) in the diversion line 88(1) is resistive. Therefore the SFM current flows down the SFM line through the control of a cryotron 99(1) and thence to the second row. Current through the control of cryotron 99(1) renders the gate thereof resistive thereby resetting the selection flip-flop 52(1) whereby the first is unselected.

The SFM current continues down the SFM line, resetting the select flip-flops of rows containing non-matching words, until the row containing the next matching word is encountered. The SFM current is there diverted through the diversion line of that row and the row is selected and read and/or write operations may be performed in the manner described hereinbefore. When read and write operations are completed in this row another SFM current pulse is applied to select the row containing the next matching word, etc. After the last matching word has been operated upon, a subsequently applied SFM current pulse is not diverted to the bypass line but flows instead through the control of a cryotron 113, the gate of which is thereby rendered resistive to signal the end of the sequence of selection. In the above-described manner, the memory may be interrogated, the matching words marked and then selected in sequence.

For some applications it is desirable to simultaneously select all of the rows that contain words which match an interrogation word. For example, with the capability of writing into individual columns or bit positions of the storage cells any selected column of storage cells may be employed as marker bits to mark or store an indication of the rows containing matching words by, for example, writing a "1" into each corresponding marker storage cell.

The simultaneous selection operation is provided by a "select all matches" (SAM) circuit 203. The SAM circuit 203 includes a SAM line 101 and a plurality of SAM branch lines 102(1)–102($m$), the SAM line and the branch line in each row being parallel connected to provide a transfer J cell as described hereinbefore in connection with FIG. 3. Simply stated, the SAM circuit 203 operates to transfer the state of the match flip-flop of each row to the selection flip-flop of the row. Thus if the match flip-flop has been set to indicate that the row contains a matching word, as described hereinbefore, operation of the SAM circuit 203 sets the selection flip-flop to select the row.

A SAM operation is performed by applying a SAM current pulse to the SAM line 101. Referring to the SAM circuit in the first row by way of example, if the match flip-flop 51(1) is in the set state, the gate of a cryotron 103(1) is resistive while the gate of a cryotron 104(1) is superconductive. Thus the SAM current flows through the control of a cryotron 105(1) in the reset side of the selection flip-flop 52(1) thereby rendering the gate of cryotron 105(1) resistive to place the selection flip-flop 52(1) in the set state whereby the first row is selected, that is, conditioned for read and/or write operations as explained hereinbefore.

On the other hand, if the match flip-flop 51(1) is in the reset state, the gate of cryotron 104(1) is resistive while the gate of cryotron 103(1) is superconductive. The applied SAM current is therefore diverted through the branch line 102(1) and through the control of a cryotron 106(1) to thereby place the selection flip-flop 52(1) in the reset state whereby the first row is unselected. The SAM circuit operation is similar in the other rows of the system. Thus if the match flip-flop of the row has been set to indicate that the row contains a matching word, the selection flip-flop is set to select the row. But if the match flip-flop is in its reset state, the selection flip-flop is reset and the row is unselected. Thus by operation of the SAM circuit 203 all rows that contain words which match the interrogation word are selected.

Upon completion of the SAM operation "1" (or "0") may be written into a marker bit storage cell of each row that contains a matching word in accordance with the foregoing suggested example. This is accomplished by first applying currents to the operate line 91 of operate circuit 202 and to the write control line 74. This directs the word current through the write line of each selected row. (In unselected rows the word current flows instead in the return line of the row.) Assuming that the storage cells of the first column (FIG. 4A) are to be used as marker bits, the digit switch 71(1) is closed to apply a digit current (positive for writing a "1" or negative for writing a "0") to the digit line 70(1). After these currents have stabilized, the operate current is turned off, a current pulse is applied to the read control line 75 to divert the word current out of the write line, and the digit current is then turned off. In this manner a marker bit may be written into each storage cell of the first column, that is, in a row containing a matching word.

For some applications it is desirable to enable for selection the row following a row that has been previously selected. For example, in some applications the records stored in the memory may be of such length as to require several rows of storage space. To conserve storage space it is desirable to provide record identification or marker data in only the first row of each record. In this case, the first row of a record may be selected in response to interrogation for the record marker data. Then by subsequent successive enabling and selection of next rows, the rows of the record can be selected in sequence.

The enable next row function is provided by an "enable next row" (ENR) circuit 204, shown in FIG. 4B. The ENR circuit 204 includes a pair of ENR lines 107 and 108 which are connected in each row through the gate of a respective one of the previously mentioned cryotrons 67(1)–67($m$) to form a transfer ladder. Operation will be described by assuming that the first row has been selected and that therefore the selection flip-flop 52(1) is in the set state. It is further assumed that the selection flip-flops of all other rows are in the reset state.

To perform an ENR operation an ENR current pulse is applied to the line 107. The ENR current first passes through the control of a cryotron 109(1) thereby resetting the match flip-flop 51(1). The gate of a cryotron 110(1) is resistive because of the set state of selection flip-flop 52(1). The ENR current is therefore diverted through the gate of cryotron 67(1) to the line 108. The ENR current now flows down the line 108 and through the control of a cryotron 111(2) the gate of which is in the reset side of the match flip-flop 51(2) of the second row. The gate of cryotron 111(2) therefore becomes resistive whereby the match flip-flop 51(2) is placed in the set state. Because the selection flip-flop 52(2) is in the reset state, the gate of a cryotron 112(2) is resistive. The ENR current is therefore diverted from the line 108 back to the line 107 through the gate of cryotron 67(2) and thence down the line 107 through the other rows of the system to the common terminal 64.

With the match flip-flop 51(2) of the second row now in the set state and all other match flip-flops in the reset state, the second row is now enabled for selection and the selection flip-flop 52(2) may be placed in the set state to select this row by performing a SFM or SAM operation as previously described. Either of such operations resets the selection flip-flop 52(1) of the first row and sets the selection flip-flop 52(2) of the second row whereby the second row is the only row selected. By successive repetition of the foregoing operations each successive row of any number of successive rows may be selected.

Further details of the memory system will be apparent from the following examples from the wide variety of functions that the system is adapted to perform.

*AND separate searches*

The system is adapted to logically AND a series of separate searches on interrogations, that is, at the conclusion of the series of interrogations only the rows containing words which match all of the interrogation words remain enabled for selection. For the purpose of illustrating the performance of this logical function, assume that the stored words comprise several data facts, each data fact being stored in a predetermined group of bit positions or columns, and that each interrogation word of the series corresponds to one of the several data facts.

The system is adapted to perform the logical AND function in several ways. A first example is as follows: Apply a preset current pulse to the preset line 73. This causes the word current to flow in the associative line of each row. Now perform the successive interrogations, corresponding to the series of interrogations to be ANDed, by applying digit currents to appropriate succesive combinations of the digit lines 70(1)–**70(*n*) to represent the successive interrogation words. After the succession of interrogations is completed, the word current remains in the associative line of each row that contains a word which matches each one of the interrogation words while in the other rows the word current has been diverted to the shunt line. This information, as represented by word current in the associative lines of matching rows, can now be transferred to the match flip-flops by operation of the transfer circuit 200** as previously described.

According to another example of performing the logical AND function, the preset operation is first performed to cause the word current to flow in the associative line of each row. A conditional set transfer is then performed by applying a transfer current pulse to line 76 of the transfer circuit 200. This places all of the match flip-flops 51(1)–**51(*m*) in the set state. Now for each interrogation word of the series to be ANDed, the interrogation is performed followed by a conditional reset transfer operation which, it will be recalled, is performed by applying a transfer current pulse to transfer line 77**. If the word stored in a row fails to match any one of the interrogation words the word current in the associative line is diverted to the shunt line of that row. Thus in response to the word current in the shunt line and the conditional reset operation, the match flip-flop of that row is reset. Thus at the conclusion of the series of interrogations and conditional reset transfer operations, only the match flip-flops in rows containing words which match all of the interrogation words remain in the set state.

According to yet another example of performing the logical AND function, the match information for each interrogation word is stored in marker bits reserved in the memory. Then to enable for selection the rows which contain words that satisfy an AND function, a final interrogation is performed on the marker bit columns. More specifically, a column of storage cells is reserved as a marker bit position for each interrogation word of the series to be ANDed. For example, if there are four interrogation words in the series, then four columns of storage cells, which for convenience will be designated M1, M2, M3, and M4, are reserved as marker bit storage positions. Operation is as follows: For each interrogation word of the series an interrogation is performed and all rows containing matching words are selected by operation of the SAM circuit 203 as previously described. A write operation is then performed to write an indication of each matching row into the corresponding marker bit positions. For example, for the first interrogation a "1" can be written into each storage cell of marker bit column M1 that is in a row containing a matching word. At the conclusion of the series of searches or interrogations to be ANDed, an interrogation can then be made for all "1's" in the marker bit columns M1, M2, M3 and M4. In a row that contains a word which matches all of the interrogation words, each marker storage cell contains a "1." Such rows therefore match the maker bit interrogation and these rows can be selected as described hereinbefore.

*OR separate searches*

The system is adapted to logically OR a series of separate searches or interrogations, that is, at the conclusion of the series of interrogations the rows containing words that match any one or more of the interrogation words remain enabled for selection. The system is adapted to perform this logical OR function in any of several ways.

According to one example of performing the logical OR function, after each interrogation of the series, a conditional set transfer operation is performed by applying a transfer current pulse to only transfer line 76 (it being assumed that the match flip-flops are initially in the reset state). In each row which contains a word that matches the current interrogation word of the series the match flip-flop of the row is set in response to word current in the associative line and the conditional set transfer operation. However, match flip-flops which have been set in response to previous interrogations of the series are not affected because the conditional set transfer operation, as previously described, does not reset the match flip-flops. Thus after the series of interrogations and transfers, the match flip-flop in each row that contains a word which matches one or more of the interrogation words is in the set state. The rows thus marked may then be selected.

According to another example of performing the logical OR function, a single column of storage cells is reserved for marker bit storage. After each interrogation of the series the rows containing matching words are selected by operation of the SAM circuit 203. A write operation is then performed and a "1," for example, is written into the marker bit storage cell of each matching row. After the series of interrogations is completed, the marker bit column is interrogated to a "1" to locate the words that have been marked at matching one or more of the series of interrogation words.

*Sequentially select all rows*

It is often desirable to select in sequence all of the storage locations of the memory. Such an operation is useful, for example, for reading out all of the stored information, for rearranging information and for writing new information. The system is adapated to perform this operation in the following manner. A preset operation is first performed by applying a current pulse to the preset line 73. This operation directs the word current through the associative line of each row. An unconditional or a conditional set transfer is now performed by operation of the transfer circuit 200. As a consequence, the match flip-flop in each row is placed in the set state thus enabling for selection all of the rows of the memory system. Sequential selection of each successive row can now be achieved by successive operations of the SFM circuit 201 as previously described.

It is noted that the sequential selection of rows can also be accomplished by successive operation of the ENR (enable next row) circuit 204 as described hereinbefore.

*Clear memory*

For some purposes a storage location may be considered clear if it contains all "0's." This condition can, of course, be achieved in any selected row by writing a "0" in each bit position. The entire memory, or selected columns thereof, can be cleared in this manner by first enabling all rows for selection as described above in connection with the sequentially select all rows operation. However, instead of selecting the rows sequentially, all rows may be selected at once through operation of the SAM circuit 203. This allows the writing of "0's" in all rows substantially simultaneously.

For other purposes a storage location may be considered clear (or empty) only if the storage cells thereof contain no persistent currents. Persistent currents can be removed from all the storage cells of a selected row (or from selected storage cells of the row) by an operation which is similar to a write operation as follows.

Referring to the top or first row of FIGS. 4A and 4B, it will be recalled that for a write operation currents are applied to the write control line 74 and the operate line 91 to direct the word current through the write line 53(1). Also, digit currents, corresponding to the bits to be written, are applied to the digit lines 70(1)–**70(*n*). After a time sufficient for these currents to stabilize, the word current is forced out of the write line by application of a current pulse to the read control line 75** and the digit currents are turned off.

To remove all persistent current from a storage cell the write operation is modified by turning off the digit currents, in the columns containing the cells to be cleared, before the word current is diverted from the write line. Referring to storage cell 50(1)(1), with the word current remaining in the write line 53(1), the gate of cryotron 24′ remains resistive. This resistance dissipates the persistent current in the storage loop. (It is noted that the full word current remains in the control of cryotron 24′ when the digit current is turned off despite the fact that the parallel connected gate of the cryotron 25′ becomes superconductive upon removal of the digit current. This is in accordance with the previously stated principle that a current once established in a superconducting line remains in that line even though parallel paths subsequently become superconductive.) The entire memory can be cleared in this manner by selecting all rows as described hereinbefore.

It is also noted that with the capability of individual bit writing, a column of storage cells can be reserved and employed to mark the location of "empty" or available storage locations.

*Select first available location*

If a storage location is considered to be available when the storage cells thereof all contain "0's," such available storage locations can be enabled for selection by interrogating with an interrogation word of all "0's." A SFM operation can then be performed to select the first of such available locations.

If, on the other hand, a storage location is considered to be available only when the storage cells thereof contain no stored persistent currents, the available locations thus defined can be enabled for selection by logically ANDing, as described hereinbefore, a first interrogation of the locations with all "0's," and a second interrogation with all "1's." Only storage cells without stored persistent current satisfy both criteria. After such available locations have been enabled for selection in response to the ANDed interrogation, a SFM operation can be performed to select the first location.

*OR and NOT AND of bit positions*

For some applications it is desirable to ascertain whether one or more bit storage cells in simultaneously selected rows and in a given column are in a predetermined information representing state. It will be recalled that during a read operation a voltage appears on the digit line in response to a positive (downward) applied digit current if the storage cell contains a "1." If more than one row of the memory system is selected and a read operation is performed in a given column, a voltage on the digit line of the column in response to a downward digit current indicates that at least one of the storage cells in the selected rows and in the given column contains a "1." In this manner, selected bits in a selected column or bit position can be ORed.

Similarly, if more than one row is selected and a negative (upward) digit current is applied to a given column during a read operation, a voltage on the digit line indicates that at least one of the selected storage cells of the given column contains a "0." In this way, the logical function of NOT AND is performed on the selected bits of the given column.

*Comparison logic*

The system is adapted to mark each row of the memory to indicate whether the row contains a word which, in the bit positions of an interrogation, is "equal to," "less than" or "greater than" the interrogation word. This capability also allows selection of all words between (and including if desired) specified limits. The following chart illustrates the performance of comparison logic according to a first example.

| Interrogation Word | 1 | 0 | 1 | 0 | 0 |
|---|---|---|---|---|---|
| Bit Positions | 1st | 2nd | 3rd | M1 | M2 |
| 1st row | 0 | 0 | 1 | 0 | 1 |
| 2nd row | 0 | 1 | 0 | 0 | 1 |
| 3rd row | 0 | 1 | 1 | 0 | 1 |
| 4th row | 1 | 0 | 0 | 0 | 1 |
| 5th row | 1 | 0 | 1 | 0 | 0 |
| 6th row | 1 | 1 | 0 | 1 | 0 |
| 7th row | 1 | 1 | 1 | 1 | 0 |

Marker bit columns designated M1 and M2 are provided for marking the stored words which are equal to, less than or greater than an interrogation word "101." The chart shows the final states of the marker bits after the comparison operations according to the first example are completed. Operation is as follows:

The bit positions of the memory are interrogated sequentially, highest order first, with the complement of the corresponding interrogation bit. At the same time the marker bit columns M1 and M2 are interrogated with "0's" whereby only rows not yet marked are selected. If the complement of the interrogation bit is a "1," a "1" is written in the marker bits in the M1 column corresponding to each matching word. If the complement of the interrogation bit is a "0," a "1" is written in the marker bits in the M2 column corresponding to each matching word. The operation is repeated for each lower order bit position in sequence.

For example, the highest order bit of the interrogation word of the above chart is a "1"; therefore the 1st bit position is interrogated with a "0" and a "1" is written into the M2 marker bits of the 1st, 2nd and 3rd rows. The next lower order interrogation bit is a "0," therefore the 2nd bit position is interrogated with a "1" (marker columns M1 and M2 being simultaneously interrogated with "0's"). The 6th and 7th memory rows match this interrogation. (The 2nd and 3rd rows do not match because of the "1's" in M2 in these rows.) Therefore a "1" is written in the M1 column at the 6th and 7th rows. Similarly, the 3rd bit position is interrogated with a "0" and a "1" is written in the M2 marker bit of the 4th row.

Thus at the conclusion of the above operations the marker bit M1 is "0" and the marker bit M2 is "1" in each row that contains a word which is less than the interrogation word. Both marker bits are "0" in rows containing words equal to the interrogation word, and the marker bit M1 is "1" and the marker bit M2 is "0" in each row that contains a word which is greater than the interrogation word. The words thus marked may be selected, simultaneously or in sequence as described hereinbefore, by appropriate interrogation of the marker columns M1 and M2.

The words between limits, as represented by first and second interrogation words, may be marked by performing the above described comparison operation for each of the two interrogation words, the comparison information for the first interrogation word being stored in marker bit columns M1 and M2, and the comparison information for the second interrogation word being stored in a pair of marker bit columns M3 and M4. The words between limits will then be marked M1="0," M2="1," M3="1" and M4="0."

The system is adapted to perform a somewhat different comparison operation where only words less than or greater than an interrogation word are required to be marked. Only a single column of marker bits is required, the marker bits initially being "0."

The mark the words in memory that are less than an interrogation word, operation is as follows: Start with the least significant bit of the interrogation word. If this least significant bit is a "0," this bit is masked out of the interrogation. If the bit is "1," change it to a "0" and interrogate with the thus modified interrogation word. The rows containing matching words are selected and a "1" is written in the corresponding marker bits of the marker bit column. The interrogation bit in this bit position is then masked out of the interrogation and the operation is repeated for each next higher order interrogation bit in sequence, the masked out portion increasing from least to most significant bit positions. When these operations are completed the marker bit is a "1" in rows containing words less than the interrogation word, while the marker bit is "0" in rows containing words that are equal to or greater than the interrogation word.

By similar operation the "greater than" words can be marked. In this case, again starting with the least significant bit of the interrogation word, if the interrogation bit is a "1" it is masked out whereas if it is a "0" it is changed to a "1" and an interrogation performed with the thus modified interrogation word. The operations are otherwise the same and when they are completed the marker bit is a "1" in rows containing words that are greater than the interrogation word.

Another operation for performing "between limits" comparison logic is also available. Only a single marker bit column is required, the marker bits initially being "1." To compare the stored words with first and second limit words corresponding respectively to lower and upper limits, the bits of the limit words are considered in sequence starting with the highest order or most significant bit position. At each bit position, if the bit of the lower limit word is a "1," interrogate with a "0" in this bit position and with all of the higher order bits of the lower limit word. The rows containing words that satisfy the interrogation are selected and "0's" written in corresponding marker bit storage cells. If, however, the bit of the lower limit word, in the bit position under consideration, is a "0" no lower limit interrogation is performed for this bit position.

The bit of the upper limit in this bit position is then considered. If this upper limit bit is a "0," interrogate with a "1" in this bit position and with all higher bits of the upper limit words. The rows containing words that satisfy this interrogation are selected and "0's" written into corresponding marker bit storage cells. If, however, the bit of the upper limit word is a "1," no upper limit interrogation is performed for this bit position.

After all bit positions have been thus considered, and interrogate and write operations performed accordingly, the marker bit column contains a "1" in each row that contains a word which has a value between the limit words or equal to one of them, while words outside of the limit words are marked with "0" marker bits.

*M out of N searches*

For certain data processing operations it is desirable to retrieve information which satisfies at least a certain number but not necessarily all criteria of a series of criteria. More specifically it is desirable to select data words which contain at least M of a series of N data facts as represented by a corresponding series of N interrogation words.

The content addressed memory system of the present invention is adapted to perform such a search in several ways, one of which is set forth as follows: A set of N columns of marker bit storage cells is provided, in each column of which the results of one interrogation is stored, the series of N interrogations being performed in sequence. Thus the data words are interrogated with the first of the series of N interrogation words and a "1" is written in the first marker bit column in the rows containing matching words (while a "0" remains in the first marker bit column in rows containing non-matching words). The second interrogation word is next applied and the match information in response to this word is written into the second marker bit column, etc.

After this series of interrogations is completed, the marker bits are rearranged by a series of interrogations of the marker bit columns as follows: For the first interrogation of this series, interrogate the first marker bit column with a "0" and the second marker bit column with a "1." Select all matching rows and write a "1" in the first and a "0" in the second marker bit columns. For the second interrogation of this series, interrogate the first marker bit column with a "0" and the third marker bit column with a "1." Again select matching rows and write a "1" in the first and a "0" in the third marker bit columns. Continue this series of interrogations, including finally the interrogation of the first marker bit column with a "0" and the Nth marker bit column with a "1," writing the resulting match information in the corresponding marker bit columns as indicated above.

The rearrangement of the marker bits is continued by interrogating successively the second marker bit column with a "0" and successively higher order marker bit columns with "1," then interrogating successively the third marker bit column with a "0" and successively higher order marker bit columns with a "1," etc. The rearrangement terminates with interrogation of the N–1 marker bit column with a "0" and the Nth marker bit column with a "1."

When these interrogations are completed, the marker bit storage cells contain "1's" in the first M marker bit columns in rows that match M of the series of N interrogation words. Thus if it is desired to select all data words that match M or more of the N interrogation words, the first M marker bit columns are interrogated with "1's." If it is desired to select data words that match exactly M of the N interrogation words, the first M marker bit columns are interrogated with "1's" and the remaining marker bit columns with "0's."

*Block selection*

For certain data processing applications it is desirable to store blocks of data, comprising a plurality of related data words, in the memory in sequentially occurring word storage positions or rows. To conserve storage space it is desirable to have block identification data in only the first and last rows of the block. Also it may be desirable to store several related blocks of data in separated locations in the memory, each of these related blocks having the same block identification data in its first and last rows. The present system is adapted to perform the function of association between stored words by locating and marking the rows of a block (and the rows of multiple blocks) in response to interrogations for block identification data in the first and last rows.

For convenience of explanation, the interrogation word corresponding to the block identification data of the block (or blocks) to be marked is designated B. The interrogation word B may include one of several bits, it being understood that the formating is such that the block identification data of the stored blocks is placed in predetermined columns or bit positions and that the bits of the interrogation word B are applied to these bit positions.

According to the following example of performing the block selection function, two columns of marker bit storage cells are required to mark multiple blocks. These marker bit columns will be designated M1 and M2. The M1 column of marker bits is used to mark the location of the rows of the blocks, while the M2 column of marker bits is used to indicate that the rows of a particular block have been marked. (If only one block is to be selected, the M2 column of marker bits is not required.) The marking of the rows of the blocks is performed by a series of interrogation, selection and write operations as follows:

First, all rows are selected by performing in sequence a preset, a transfer and a SAM operation as have been previously described. This places the selection flip-flops of all rows in the set state.

Second, the following operations are performed: Interrogate the memory with the interrogation word B and the M2 column with "0," transfer, select first match (SFM), then apply operate and write control currents and write a "1" in the M1 column of the selected rows. The SFM operation resets all of the selection flip-flops above the row containing the first word that matches the interrogation word B (the first row of the first block). Thus, by the write operation, a "1" is written in the M1 column in each row including and following the first row of the first block. A select all matches (SAM) operation is now performed to reset all of the selection flip-flops.

Third, an interrogation with B and with "0" in the M2 column is again performed and the first row of the first block is again selected for the purpose of writing a "1" into the M2 column marker bit storage cell of the row. With this row thus marked, it will not again be selected in searches for subsequent of multiple blocks.

Fourth, the selection flip-flops of all rows are set by repeating the first set of operations described above.

Fifth, the second set of operations described above is repeated with the exception that "0's" instead of "1's" are written in the M1 column. By this set of operations the second row that contains a word matching the interrogation word B (the last row of the first block) is located, and a "0" marker bit is written in the M1 column in each row including and following the last row of the first block.

Sixth, the third set of operations as set forth above is repeated with the exception that "1's" are written as marker bits in both M1 and M2.

By the foregoing sets of operations all rows of the first block, corresponding to the interrogation word B, are marked with a "1" in the M1 marker bit column and the first and last rows of this block are marked with a "1" in the M2 marker bit column. All other marker bit storage cells contain a "0." An interrogation with "1" in the M1 marker bit column now allows selection of the rows of the first matching block.

Other matching blocks can be located and marked by repeating the foregoing sequence of sets of operations. An indication that all matching blocks have been located is provided by the cryotron 113 (FIG. 4B), the gate of which will be resistive during the SFM operation of the second set of operations if no further matching words are present in the memory.

It is noted that the AND and OR logic functions described hereinbefore can be performed in marked blocks by interrogating for a "1" in the M1 marker bit column along with each interrogation word of the series to be ANDed or ORed. By including this interrogation of the M1 marker bit column, rows outside of the marked blocks are excluded even though they may otherwise match an interrogation word.

*Complementing*

In data processing operations it is frequently desirable to complement a binary word, that is, to change all the "0's" of the word to "1's" and change the "1's" to "0's." It will be recalled that during a normal read operation a storage cell produces a resistance to a downward or positive digit current if the cell contains a "1" but produces no resistance if the cell contains a "0." However, the converse is true when an upward or negative digit current is applied, that is, a stored "0" then produces resistance while a "1" does not. Thus a word may be simply complemented by performing a read operation in which upward or negative digit currents are applied and the presence of resistance is interpreted as a "1" while the absence of resistance is interpreted as a "0."

*Rearrangement of bits*

For certain data processing applications it is desirable to rearrange the bits (or selected bits) of a word. Such an operation is useful, for example, for encoding, for decoding and for converting from one code to another. A simple example of the rearrangement of the bits of a binary word is illustrated by the following chart in which the word to be rearranged is "110" and the rearranged word is "101"

| | | | | |
|---|---|---|---|---|
| Word to be rearranged | 1 | 1 | 0 | |
| Rearranged word | 1 | 0 | 1 | |
| Interrogation word | 1 | 1 | 0 | 1 |
| Columns— | 1st | 2nd | 3rd | M |
| 1st Set | 1 | – | – | 1 |
| | – | – | 1 | 0 |
| 2nd Set | – | 1 | – | 1 |
| | 1 | – | – | 0 |
| 3rd Set | – | – | 1 | 1 |
| | – | 1 | – | 0 |

As illustrated by the above chart, the rearrangement is accomplished through the use of a stored table which requires only a pair of stored words for each bit to be rearranged. This is in contrast to more conventional approaches which require the storage of all the possible combinations of the bits.

This simplification of the table is possible with the present system because of the ability to store a "no comment," that is, the absence of a persistent current in a storage cell. This "no comment" state is represented in the above chart by a dash. This ability to store a "no comment" in any storage cell provides what may be considered to be internal masking. This ability adds greatly to the flexibility and versatility of the system. (It will be recalled that a storage cell which does not contain a persistent current satisfies an interrogation with either "0" or "1." Furthermore, a storage cell in this state does not produce resistance in the digit line for either direction of digit current during a read operation.)

Referring to the above chart, the first row of each set of rows of the stored table contains a "1" in a respective one of the columns or bit positions of the word to be rearranged while the other storage cells of the row are in the "no comment" state. The second row of each set of rows of the stored table contains a "1" in a respective column to which the bit indicated by the first row of the set is to be, in effect, transferred the other storage cells of the second rows of each set being in the "no comment" state.

For example, in the first row of the first set, the storage cell in the 1st column is in the "1" representing state and in the second row of the first set the storage cell in the 3rd column is in the "1" representing state. Thus each set of words of the table is a logically connected pair of words relating the present position of a bit to the prospective position of the bit. It is also noted that the first row of each set of rows of the table is marked with a "1" in a marker bit column M while the second row is marked with a "0."

The rearrangement operation is as follows: The table is interrogated with the word "110" to be rearranged. Simultaneously the marker bit column is interrogated with a "1," as indicated. The first words of the 1st and 2nd sets of words of the table satisfy this interrogation. The rows containing these words are now simultaneously selected by the performance of a SAM (select all matches) operation as described hereinbefore.

An ENR (enable next row) operation is next performed by which the second rows of the 1st and 2nd sets of rows of the table are enabled for selection. The ENR operation thus allows the treatment of each set of rows of the table as a logical entity. Another SAM operation now selects these rows for a read operation. With the second row of the first set and the second row of the second set thus selected, a read operation is performed including the application of downward digit currents to the digit lines of the 1st, 2nd and 3rd columns. The "1" in the 1st column and second row of the 2nd set produces a resistance in the 1st column. Similarly, the "1" in the 3rd column and second row of the 1st set produces a resistance in the 3rd column, no resistance being produced in the 2nd column. The rearranged word is therefore "101." It is noted that this operation of reading simultaneously selected rows is logically an ORing of the bits in each column which are in the simultaneous selected rows.

The foregoing simple example illustrates the basic operation of rearrangement. Expansion of the operation is believed apparent. While the foregoing example illustrates the transfer of single bits to other bit positions, it is clear that a combination or pattern of bits can be converted to a different pattern of bits or to a single bit in a particular bit position as would be necessary, for example, in code translations. Also, while a pair of words is illustrated for each set of logically connected words, this is not a limitation and any reasonable number can be included in each set, the successive words of the sets being selectable through use of the ENR (enable next row) operation.

The foregoing example also points up the novel characteristics of the empty or "no comment" state of the storage cell of the present invention. In an interrogation operation the "no comment" state satisfies an interrogation with either a "0" or a "1." In a read operation, in a test for "1's" with a downward or positive digit current, a "no comment" state has the characteristics of a "0," that is, it does not produce resistance, whereas, in a test for "0's" with an upward or negative digit current, a "no comment" state has the characteristics of a "1," that is, again it does not produce a resistance.

The foregoing examples of the various functions that the content addressed memory system of the invention is adapted to perform are far from exhaustive of the capabilities of the system; however, they are believed to be sufficient to demonstrate the extreme versatility and flexibility of the system.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In a content addressed memory system, a storage cell comprising: a digit line; first, second, third, fourth and fifth cryotrons, the gates of said first and second cryotrons being connected in parallel, the gate of said first cryotron, the control of said third cryotron, the gate of said fourth cryotron and the control of said fifth cryotron being connected in series with said digit line, the control of said second cryotron being connected in parallel with the series connected control of said third cryotron and gate of said fourth cryotron, the gate of said fifth cryotron being connected in parallel with the control of said fourth cryotron; a read line including the control of said first cryotron; an associative line including the gate of said third cryotron; a write line including said control of said fourth cryotron; a shunt line; and selectively operable means for connecting said shunt line in parallel with said associative line.

2. In a content addressed memory system, a bit storage cell comprising: a normally superconductive loop for storing a persistent current; a digit line for applying a digit current to said loop, said loop providing a pair of parallel paths for said digit current; a first cryotron having its gate connected in one of said paths; a write line including the control of said first cryotron; and a second cryotron having its gate connected in parallel with said control of said first cryotron, said digit line including the control of said second cryotron whereby said gate of second cryotron is rendered resistive in response to said digit current.

3. In a content addressed memory system, the combination of: a storage cell having at least two information representing states; a digit line in said storage cell; a write line in said storage cell; means for changing the information representing state of said storage cell including means for applying concurrent currents to said digit line and said write line; and means responsive to current in said digit line for rendering said cell responsive to said write current, said means being operable in the absence of the application of current to said digit line for preventing current applied to said write line from affecting the information representing state of said storage cell.

4. In a content addressed memory system, the combination of: a storage cell having a plurality of information representing states; a write line; means for selectively applying a current to said write line, said storage cell normally providing a plurality of current paths for the current applied to said write line whereby the portion of the current in a given one of said plurality of paths is insufficient to affect the information representing state of said storage cell; a digit line; means for selectively applying a current to said digit line; and means responsive to the current applied to said digit line for directing all of the current applied to said write line through said given one of said plurality of paths.

5. In a content addressed memory system, the combination of: a row of normally superconductive loops providing a plurality of bit storage positions; a plurality of digit lines, one for each of said bit storage positions, for applying digit current to selected ones of said loops, each loop providing a pair of parallel paths for the digit current applied thereto; a plurality of first cryotrons, one for each of said bit storage positions each having its gate connected in one of said paths of the loop in the bit storage position; a write line including, in series, the control of each of said first cryotrons; and a plurality of second cryotrons, the gate of each being connected in parallel with the control of a respective one of said first cryotrons, the control of each being included in a respective digit line.

6. In a content addressed memory system, the combination of: a row of bit storage cells each cell corresponding to a digit position; a write line passing through the cells of said row; means for applying a current to said write line, said current being of sufficient magnitude to affect the condition of said cells; a normally effective bypass circuit in each cell for bypassing a sufficient amount of said current whereby the remainder of said current in said write line through said cell does not affect the condition of said cell; a respective digit line in each digit position; means for applying a digit current to each of selected digit lines; and means in each cell responsive to said digit current in the digit line of the corresponding digit position for rendering ineffective said bypass circuit in said cell.

7. In a content addressed memory system, the combination of: a plurality of bit storage cells each having a plurality of data representing states, said storage cells being arranged in rows and columns; means for performing an interrogation of selected columns of said storage cells; means responsive to the interrogation for providing an indication of each row wherein the states of the interrogated storage cells satisfy the interrogation; means controlled by said indication for selecting for write operations at least one of the rows providing said indication; means for selecting at least one column for write operations; and means for writing in the storage cells corresponding to the selected rows and selected columns without affecting the data representing state of storage cells in unselected rows and unselected columns.

8. In a content addressed memory system having a plurality of bit storage cells arranged in rows and columns, the combination of: interrogation means for performing an interrogation of selected columns; a first line and a second line in each row forming parallel current paths; means responsive to said interrogation for causing current flow in said first line of each row that contains stored bits which match said interrogation and for causing current flow in said second line of each row that contains at least one stored bit which does not match said interrogation; a match-indicating circuit in each row having a first state and a second state; a transfer circuit selectively operable in response to current in said first line to place said match-indicating circuit in its first state and in response to current in said second line to place said match indicating circuit in its second state; a selection circuit in each row having a set state and a reset state, said selection circuit being operable when in its set state to enable its row for read and write operations and being operable when in its reset state to disable its row for read and write operations; a selectively operable select first match circuit responsive to the first match indicating circuit which is in its first state to place the selection circuit of the corresponding row in its set state; a selectively operable select all matches circuit responsive to each match indicating circuit which is in its first state to place the selection circuit of each corresponding row in its set state; selectively operable writing means for writing in storage cells corresponding to selected columns and rows in which the selection circuit is in its set state without affecting the bit representing states of other storage cells; and a selectively operable enable next row circuit responsive to each selection circuit which is in its set state for placing the match indicating circuit of the following row in its first state.

9. In a content addressed memory system having a plurality of bit storage cells arranged in rows and columns, the combination of: interrogation means for performing an interrogation of selected columns; indicating means responsive to said interrogation for indicating each row that contains stored bits which match said interrogation; a select all matches circuit responsive to said indicating means for simultaneously enabling for write operations all indicated rows; and means for simultaneously writing in storage cells corresponding to selected columns and enabled rows without altering the bit representing state of storage cells in unselected columns.

10. In a content addressed memory system having a plurality of bit storage cells arranged in rows and columns, the combination of: interrogation means for performing an interrogation of selected columns; indicating means responsive to said interrogation for indicating each row that contains stored bits which match said interrogation; a select first match circuit responsive to said indicating means for selecting, for write operations, only the first indicated row; and selectively operable writing means for writing in storage cells corresponding to selected columns and said first indicated row without altering the bit representing states of storage cells in unselected columns.

11. In a content addressed memory system having a plurality of bit storage cells arranged in successive rows and columns, the combination of: a match indicating circuit in each row, said match indicating circuit having a first state and a second state; selection means in each row, said selection means having a first state and a second state; an enable next row circuit operable in response to said first state of said selection means of one row to place the match indicating circuit of the next row in succession of said memory in its said first state.

12. In a content addressed memory system having a plurality of bit storage cells arranged in rows and columns, the combination of: interrogation means for interrogating selected columns; indicating means responsive to said interrogation for indicating each row that contains stored bits which satisfy said interrogation; selection means responsive to said indicating means for enabling indicated rows for write operations; and writing means controlled by said selection means for marking in a selected column of said storage cells the location of each enabled row.

13. In an associative memory system, the combination of: a plurality of bit storage cells arranged in rows and columns, each row adapted to store a data word, each of said words including a plurality of data facts, one of said columns corresponding to each bit position of the stored words, others of said columns being reserved as marker columns; interrogation means for interrogating said stored words with a series of interrogation words, each interrogation word corresponding to at least one of said data facts; means responsive to the interrogation with each one of said interrogation words for marking in a respective one of said marker columns the rows containing stored words which match said one of said interrogation words whereby each row that contains a word which matches all of said interrogation words is marked in each marker column; and means for selecting such marked rows.

14. In an associative memory system, the combination of: a plurality of bit storage cells arranged in rows and columns, each row providing storage for a data word, each of said words including a plurality of data facts, one of said columns corresponding to each bit position of the stored words, one of said columns comprising a marker column; interrogation means for interrogating said stored words with a series of interrogation words, each interrogation word corresponding to at least one of said data facts; means responsive to the interrogations for marking in said marker column each row that contains a stored word which matches at least one of said interrogation words; and means for selecting such marked rows.

15. In a content addressed memory system having a plurality of bit storage cells arranged in rows for storing binary words and columns corresponding to bit positions of said word, first and second columns being reserved as marker columns, means for marking each row as containing a word which is less than, equal to, or greater than a given binary interrogation word, comprising: means for performing a series of interrogations including, means for interrogating, in turn, successive columns corresponding to the highest and successively lower order bit positions of said stored words with respective complements of the highest and successively corresponding lower order bits of said given interrogation word and simultaneously interrogating for the absence of marks in said marker columns; means operable after each respective interrogation for marking in said first marker column all rows which satisfy said respective interrogation if the corresponding complement is a predetermined binary value and for marking in said second marker column all rows which satisfy said respective interrogation if the corresponding complement is other than said predetermined binary value whereby rows containing words having a value greater than said given interrogation word are marked in said first marker column, rows containing words having a value less than said given interrogation word are marked in said second marker column, and rows containing words equal to said given interrogation word are unmarked.

16. In a memory system, the combination of: an information storage cell; a write line communicating with said cell; means for applying a write signal to said write line, said storage cell providing a first and a second path for said write signal and including means for normally directing said write signal through said first path; a digit line communicating with said cell; means for applying a digit signal to said digit line; means responsive to said digit signal in said digit line for directing said write signal through said second path; and means responsive to said write signal in said second path for enabling storage of information in said cell.

17. In a memory system, the combination of: a plurality of bit storage cells, each having a plurality of data representing states and arranged in a plurality of multi-bit word storage positions; control means for applying interrogation signals to selected bit positions of said words; a word storage position enabling circuit responsive to said interrogation signals for enabling for write operations each word storage position wherein the states of the interrogated storage cells satisfy the interrogation; a selectively operable bit position enabling signal circuit for enabling selected bit positions for write operations; a write control signal circuit in each word storage position including a normally enabled write control signal bypass circuit for each of said storage cells; and a switching device in each of said bypass circuits responsive to said bit position enabling signal for disabling the write control signal bypass circuits of the cells of selected bit positions.

18. In a memory system, the combination of: a plurality of bit storage cells arranged in a plurality of multi-bit word storage positions, each of said cells having a plurality of data representing states; a write signal circuit for each of said word storage positions; means for directing a write signal through at least one of said write signal circuits, each of said storage cells providing a normally enabled write signal bypass circuit wherein said write signal is ineffective to enable alternation of the data representing state of the cell; a bit position enabling signal circuit for each bit position of said word storage positions; means for directing a bit position enabling signal through at least one of said bit position enabling signal circuits; and means in each storage cell responsive to said bit position enabling signal for disabling said write signal bypass circuit of the storage cell for rendering said write signal effective to enable alteration of the data representing state of the storage cell.

References Cited by the Examiner

UNITED STATES PATENTS

| | | | |
|---|---|---|---|
| 3,195,109 | 7/1965 | Behnke | 340—172.5 |
| 3,196,410 | 7/1965 | Davies | 340—173.1 |
| 3,235,839 | 2/1966 | Rosenberg | 340—173.1 |
| 3,235,845 | 2/1966 | Falkoff | 340—172.5 |
| 3,241,123 | 3/1966 | Boucheron | 340—172.5 |

OTHER REFERENCES

Sanborn, J. L.: "Memory" IBM Technical Disclosure Bulletin, vol. 4, No. 7, December 1966.

BERNARD KONICK, *Primary Examiner.*

J. BREIMAYER, *Assistant Examiner.*